No. 818,751. PATENTED APR. 24, 1906.
N. DORT.
BROOM RAKE.
APPLICATION FILED JAN. 31, 1906.

Witnesses
W. H. Cunard
Geo. E. Tew

Inventor
Newton Dort,
By Milo B. Stevens Co.
Attorneys.

UNITED STATES PATENT OFFICE.

NEWTON DORT, OF CLEVELAND, OHIO.

BROOM-RAKE.

No. 818,751.    Specification of Letters Patent.    Patented April 24, 1906.

Application filed January 31, 1906. Serial No. 298,786.

*To all whom it may concern:*

Be it known that I, NEWTON DORT, a citizen of the United States, residing at Cleveland, in the county of Cuyahoga and State of Ohio, have invented new and useful Improvements in Broom-Rakes, of which the following is a specification.

This invention is a combination rake and broom, particularly useful for raking and sweeping lawns, although capable of other uses to which it would be appropriate.

The device consists of a number of tines of improved form provided with improved means for holding said tines in proper position and for connecting the same to a handle.

The invention is illustrated in the accompanying drawings, in which—

Figure 1:
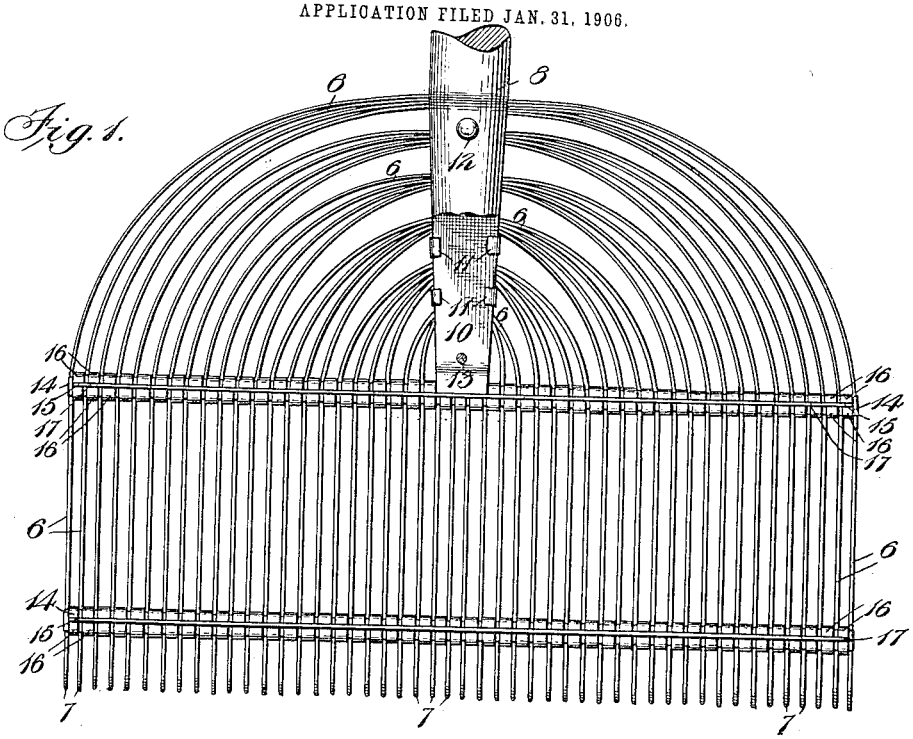
Figure 2:
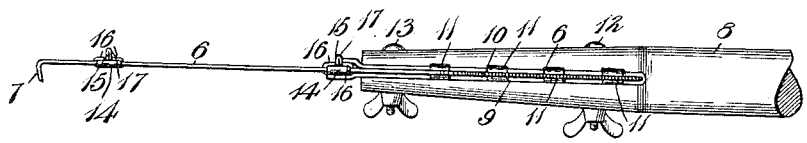
Figure 3:
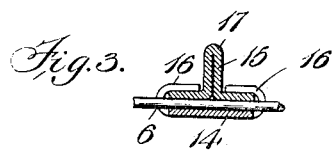

Figure 1 is a plan view thereof. Fig. 2 is an edge view. Fig. 3 is a detail in section, showing the manner of securing the tines to the cross-bars or stiffeners.

Referring specifically to the drawings, the tines, as shown, consist of a considerable number of bent wires 6, the ends of which are upset to form the teeth 7. These wires are bent so that teeth are formed at both ends, the fastening device or handle being applied at the middle of the bend. The handle is indicated at 8, and it is split at the lower end to fit over clamping-plates 9 and 10, one of which is laid upon the front of the wires and the other upon the back, and they are connected together by tongues 11, which project from the front plate and are bent over and clenched around the edges of the back plate 10. These tongues extend between the wires, which are preferably gathered into several distinct sets which extend between the tongues, and the wires in this position being close together and occupying practically all the available space between the tongues they are thereby prevented from slipping in or out or moving lengthwise, which would have the effect of putting the teeth out of line. Two bolts 12 and 13 extend through the split ends of the handle and through the plates 9 and 10, and thereby bind the head to the handle. These bolts are removable and provided with thumb-nuts, so that the handle can conveniently be shipped separate from the head and put together when sold.

The wires are stiffened and held at the proper space apart by means of cross-pieces, each of which consists of a front strip of metal 14 and a back strip 15. The former is cut or stamped to form a series of tongues 16, between which are slits corresponding in number to the number of wires, and the rear plate is provided with a rib 17 for the sake of strength and stiffness. The strip 14 is laid upon the front of the wires and the strip 15 upon the back, and the tongues 16 are then bent between the wires and over upon the back plate and clenched upon the same, the wires extending through the slits and between the plates. This binds the plates securely together and clamps them upon the wires and serves to prevent any lateral or other movement of the wires. The stiffness provided by the rib keeps the tines in line and prevents twist or disarrangement thereof under strain.

The device has the function and effect of both a broom and a rake and will be found particularly useful for gathering leaves on the lawn, for raking flower-beds, stirring straw in the stable, and the like.

I claim—

1. A rake or broom comprising a handle, a plurality of tines having teeth at both ends and connected intermediately to the handle, and a stiffening-bar extending across the tines and secured thereto.

2. A rake or broom comprising tines bent so that both ends are in line and project in the same direction, a handle secured to the tines between the ends, and a stiffening-bar extending across the tines and secured thereto.

3. A rake or broom comprising a plurality of tines in the same plane and bent around a common center, so that both ends of all the tines are in line, and project in the same direction, a handle clamped upon the tines at the bend thereof, and a stiffening-bar extending across the tines and secured thereto.

4. The combination with the tines, of a ribbed plate extending across one side thereof, and a plate extending across the other side and having tongues which are bent through between the respective tines and over the other plate.

5. The combination with the plurality of bent tines, of plates between which the tines are clamped at the bend, one of the plates having tongues bent through between the tines and over the other plate, and a handle clamped upon said plates.

In testimony whereof I have signed my name to this specification in the presence of two subscribing witnesses.

NEWTON DORT.

Witnesses:
ALICE ROOS,
SHIRLEY BOMMHARDT.